A. G. DE WOLFE.
CAOUTCHOUC MANUFACTURE.

No. 24,996. Patented Aug. 9, 1859.

Witnesses:

Inventor

UNITED STATES PATENT OFFICE.

ALVA GOODRICH DE WOLFE, OF SEYMOUR, CONNECTICUT.

MOLDING VULCANIZED GUMS.

Specification of Letters Patent No. 24,996, dated August 9, 1859.

*To all whom it may concern:*

Be it known that I, ALVA GOODRICH DE WOLFE, of the town of Seymour, county of New Haven, and State of Connecticut, have invented a new and improved mode of treating hard rubber articles for preventing the said articles from sticking to the molds in all such articles as are made in molds and also to avoid the necessity of the great labor and expense of grinding, rubbing, and polishing the surface so as to give the necessary finish to the articles when they come from the mold, or at least to so reduce the labor of finishing the articles made in molds, whether they be of hard rubber of all kinds, soft rubber, gutta percha and other vulcanizable gums covering all articles that are hollow, as well as those that are solid, when such are made in molds.

In the finishing of articles made in molds of the hard-rubber compound which are vulcanized by the ordinary means and are ordinarily covered before putting them into the mold, by a dust of soapstone or other earthy matter, the dust used in the molds penetrates the articles and requires a considerable amount of labor to remove the earthy matter from the surface of the article made.

I have found that when the dust of the vulcanized gum prepared in any suitable way is used in place of any other substance that dust appears to unite with the mass of rubber in the act of being vulcanized, so that the whole constitutes but one simple, homogeneous, substance, and yet the mass does not adhere to the surface of the mold. In that case the surface of the article so nearly conforms to that of the mold that when removed therefrom, a very little labor is required for finishing the same.

Figure 1:
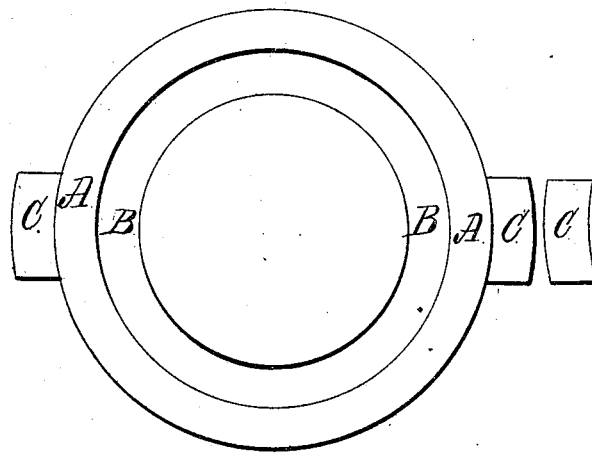
Figure 2:
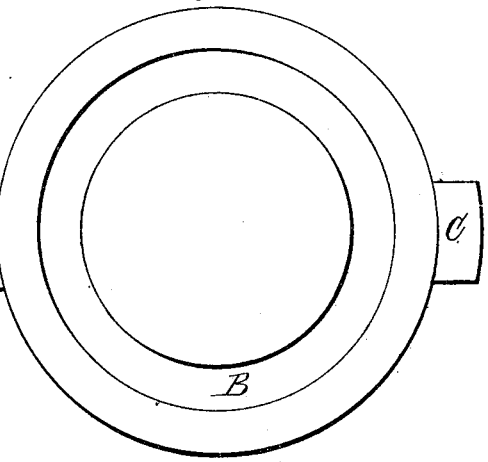
Figure 3:
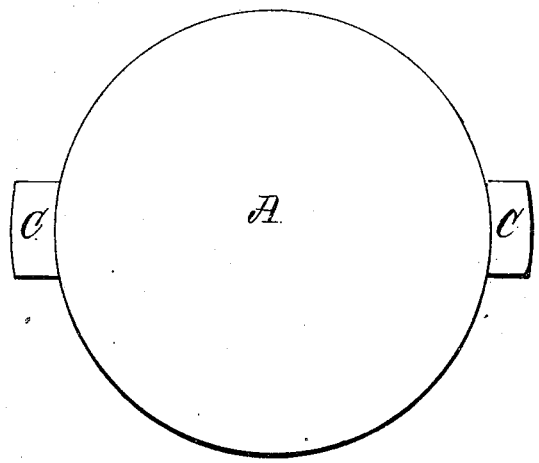
Figure 4:
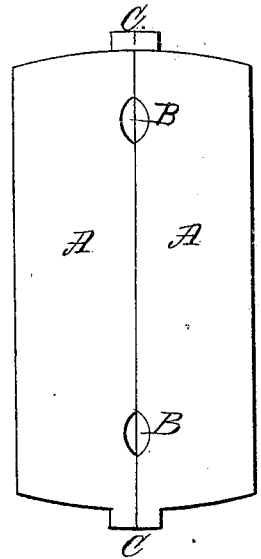

In the accompanying drawings which illustrate the device Figures 1 and 2 show the two faces of a mold on the inner faces. Fig. 3 shows the back of the mold, Fig. 4 are edge view of the mold in section.

A, A, is the body of the mold, B, B, the cavity for receiving and pressing the rubber article, previously dusted over with the vulcanized rubber.

C, C, are ears to aid in clamping the molds together during vulcanization. The molds may be lashed together by wires or any other convenient clamp during the process of vulcanizing.

That others skilled in the art may make and use my invention I will proceed to describe it.

Take any given quantity of vulcanized hard rubber or of vulcanized soft rubber or of vulcanized gutta perch and reduce it to small grains and then to powder, by any of the ordinary means now known to the manufacturer, or till it be reduced to a fine dust. Next prepare the article to be molded such as a ring, powder flask, an oil can, a comb, &c., ready to be dropped into the mold and sprinkle it over with the dust and with a little dexterity in the manipulation the larger particles will fall off while the finer portions will adhere. The article is now dropped into the mold and the mold firmly pressed together and placed in the vulcanizing chamber. When the goods are removed the articles are easily detached from the molds and are so smooth on the surface as to require but little labor to polish them. For in the act of vulcanizing the dust of the vulcanized rubber softens down and commingles with the unvulcanized gum so as to render the whole a uniform and homogeneous mass, and contrary to what would have been expected, the mass after the vulcanizing heat is over cleaves readily from the molds leaving a fine and smooth surface.

What I claim as my invention and desire to secure by Letters Patent is—

The use of pulverized vulcanized rubber, gutta percha or other vulcanized gum in the manner and for the purpose specified herein.

A. G. DE WOLFE.

Witnesses:
 SUSAN R. MANN,
 AUSTIN G. DAY.